United States Patent
Chen

(10) Patent No.: US 10,408,682 B2
(45) Date of Patent: Sep. 10, 2019

(54) METHOD AND APPARATUS FOR DETECTING DISPLAY SCREEN

(71) Applicant: BOE TECHNOLOGY GROUP CO., LTD., Beijing (CN)

(72) Inventor: Ning Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/325,417

(22) PCT Filed: Feb. 18, 2016

(86) PCT No.: PCT/CN2016/073993
§ 371 (c)(1),
(2) Date: Jan. 10, 2017

(87) PCT Pub. No.: WO2017/049855
PCT Pub. Date: Mar. 30, 2017

(65) Prior Publication Data
US 2017/0299437 A1    Oct. 19, 2017

(30) Foreign Application Priority Data

Sep. 22, 2015   (CN) .......................... 2015 1 0609064

(51) Int. Cl.
  *G01J 3/50* (2006.01)
  *G09G 3/20* (2006.01)
  *G09G 5/20* (2006.01)

(52) U.S. Cl.
  CPC ............ *G01J 3/506* (2013.01); *G09G 3/2003* (2013.01); *G09G 5/20* (2013.01);
  (Continued)

(58) Field of Classification Search
  CPC . G01J 3/506; G09G 3/2003; G09G 2360/144; G09G 2360/16
  See application file for complete search history.

(56) References Cited

U.S. PATENT DOCUMENTS

2004/0196250 A1 * 10/2004 Mehrotra ................. G09G 5/02
                                                                   345/102
2006/0227085 A1 * 10/2006 Boldt, Jr. ................. G09G 3/32
                                                                    345/83
(Continued)

FOREIGN PATENT DOCUMENTS

CN           1781135           5/2006
CN       101692326 A           4/2010
(Continued)

OTHER PUBLICATIONS

Office Action in Chinese Application No. 201510609064.6 dated Apr. 19, 2017, with English translation.
(Continued)

*Primary Examiner* — Regis J Betsch
*Assistant Examiner* — Jeremy A Delozier
(74) *Attorney, Agent, or Firm* — Womble Bond Dickinson (US) LLP

(57) ABSTRACT

A method and apparatus for detecting a display screen are provided. The apparatus comprises: a detection module for detecting components of a primary color in the light at a display side when a first and second display signal are input to the display screen, wherein the first and second display signal are used for displaying a monochromatic image in black and a monochromatic image in a color other than black; and a data processing unit for calculating a difference between components of the primary color which are detected when the first and second display signal are input, and determining whether there is a fault in the display screen according to the difference. The effect of ambient light on detection results can be reduced, and the detection results are more close to the actual case.

15 Claims, 2 Drawing Sheets

(52) U.S. Cl.
CPC . *G09G 2320/0242* (2013.01); *G09G 2330/10* (2013.01); *G09G 2330/12* (2013.01); *G09G 2360/144* (2013.01); *G09G 2360/145* (2013.01); *G09G 2360/16* (2013.01)

(56) References Cited

U.S. PATENT DOCUMENTS

| | | | |
|---|---|---|---|
| 2011/0098957 A1* | 4/2011 | Zaidi | G01J 1/4204 702/85 |
| 2012/0026315 A1 | 2/2012 | Lee et al. | |

FOREIGN PATENT DOCUMENTS

| | | | |
|---|---|---|---|
| CN | 102439982 | A | 5/2012 |
| CN | 103426403 | A | 12/2013 |
| CN | 104036706 | A | 9/2014 |
| CN | 104036707 | A | 9/2014 |
| CN | 104240624 | A | 12/2014 |
| CN | 105118411 | A | 12/2015 |

OTHER PUBLICATIONS

International Search Report and Written Opinion in PCT/CN2016/073993 dated Jun. 22, 2016, with English translation. 15 pages.
BOE Technology Group Co., Ltd, "Second Office Action," CN Application No. 201510609064.6 (dated Nov. 23, 2017).
"Third office action," CN Application No. 201510609064.6 (dated Apr. 8, 2018).

* cited by examiner

METHOD AND APPARATUS FOR DETECTING DISPLAY SCREEN

RELATED APPLICATIONS

The present application is the U.S. national phase entry of PCT/CN2016/073993, with an international filing date of Feb. 18, 2016, which claims the benefit of Chinese Patent Application No. 201510609064.6, filed on Sep. 22, 2015, the entire disclosures of which are incorporated herein by reference.

TECHNICAL FIELD

The present disclosure relates to the field of display technique, and particularly to a method and an apparatus for detecting a display screen.

BACKGROUND

Display screens are generally arranged in public places like a bus, a subway, a high-speed railway, a building, an elevator, for playing specific programs, advertisements, propagandas. These display apparatuses are subject to a high fault rate due to the complicated service environment. In order to timely detect the fault, a color sensor is currently applied to determine display faults in the display screen. In a specific detecting method, the display screen is made to display a predefined monochromatic image, e.g., a red image, a green image, or a blue image. The color sensor detects the color of images displayed by the display screen, to obtain components of red, green, and blue (RGB) primary colors in the detected color in images, for determining whether there is a display fault in the display screen.

However, in the above process for determining the fault, there is a difference between the results detected by the color sensor and the actual values due to the effect of ambient light. In particularly, in case the ambient light is strong, the difference increases, thus leading to misjudgment.

SUMMARY

The present disclosure provides a method for detecting a display screen, comprising:

detecting a component of a primary color in the light at a display side of the display screen when a first display signal is input to the display screen, wherein the first display signal is used for displaying a monochromatic image in black;

detecting the component of the primary color in the light at the display side of the display screen when a second display signal is input to the display screen, wherein the second display signal is used for displaying a monochromatic image in a color other than black; and calculating a difference between the component of the primary color which is detected when the second display signal is input and the component of the primary color which is detected when the first display signal is input, and determining whether there is a fault in the display screen according to the difference.

As an example, the component of the primary color which is detected when the second display signal is input and the component of the primary color which is detected when the first display signal is input are detected at a same position.

As an example, the component of the primary color which is detected when the second display signal is input and the component of the primary color which is detected when the first display signal is input are detected by a same color sensor.

As an example, the primary color comprises a red primary color, a green primary color, and a blue primary color.

As an example, the difference comprises a value of red primary color obtained by subtracting a component of red primary color which is detected when the first display signal is input from a component of red primary color which is detected when the second display signal is input, a value of green primary color obtained by subtracting a component of green primary color which is detected when the first display signal is input from a component of green primary color which is detected when the second display signal is input, and a value of blue primary color obtained by subtracting a component of blue primary color which is detected when the first display signal is input from a component of blue primary color which is detected when the second display signal is input.

As an example, the monochromatic image is an image in a primary color selected from a group consisting of a red primary color, a green primary color, and a blue primary color.

As an example, determining whether there is a fault in the display screen according to the difference comprises:

comparing a value of a primary color in the difference with a value of another primary color multiplied with N, to determine whether there is a fault in the display screen, wherein N is a natural number larger than zero.

As an example, after it is determined that there is a fault in the display screen, the method further comprises issuing an alert The present disclosure further provides an apparatus for detecting a display screen, comprising:

a detection module, operable to detect a component of a primary color in the light at a display side of the display screen when a first display signal is input to the display screen, wherein the first display signal is used for displaying a monochromatic image in black, and detect the component of the primary color in the light at the display side of the display screen when a second display signal is input to the display screen, wherein the second display signal is used for displaying a monochromatic image in a color other than black; and a data processing unit, operable to calculate a difference between the component of the primary color which is detected when the second display signal is input and the component of the primary color which is detected when the first display signal is input, and determine whether there is a fault in the display screen according to the difference.

As an example, the detection module comprises:

a signal output unit, operable to input the first display signal and the second display signal to the display screen;

a detection unit, operable to detect the component of the primary color in the light at the display side of the display screen;

a control unit, operable to control the detection unit to detect the component of the primary color in the light at the display side of the display screen, when the signal output unit inputs the first display signal to the display screen, and control the detection unit to detect the component of the primary color in the light at the display side of the display screen when the signal output unit inputs the second display signal to the display screen.

As an example, the primary color comprises a red primary color, a green primary color, and a blue primary color.

As an example, the difference comprises a value of red primary color obtained by subtracting a component of red primary color which is detected when the first display signal is input from a component of red primary color which is detected when the second display signal is input, a value of green primary color obtained by subtracting a component of green primary color which is detected when the first display signal is input from a component of green primary color which is detected when the second display signal is input, and a value of blue primary color obtained by subtracting a component of blue primary color which is detected when the first display signal is input from a component of blue primary color which is detected when the second display signal is input.

As an example, the monochromatic image is an image in a primary color selected from a group consisting of a red primary color, a green primary color, and a blue primary color.

As an example, the data processing unit compares a value of a primary color in the difference with a value of another primary color multiplied with N, to determine whether there is a fault in the display screen, wherein N is a natural number larger than zero.

As an example, the apparatus further comprises an alert module operable to issue an alert after it is determined that there is a fault in the display screen.

As an example, the detection unit is disposed at a same position to detect the component of the primary color which is detected when the second display signal is input and the component of the primary color which is detected when the first display signal is input.

As an example, a same detection unit is arranged to detect the component of the primary color which is detected when the second display signal is input and the component of the primary color which is detected when the first display signal is input.

DETAILED DESCRIPTION OF EMBODIMENTS

Figure 1:
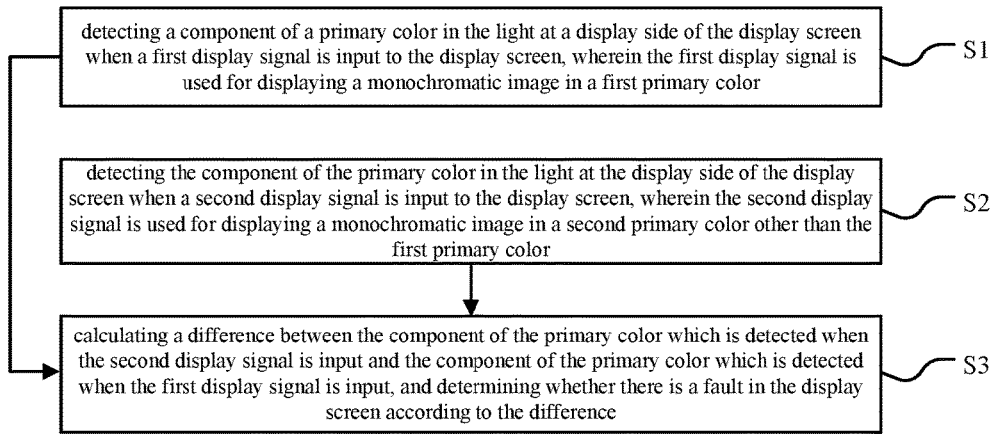
FIG. 1 is a flow chart illustrating a method for detecting a display screen in an embodiment of the present disclosure.

The specific embodiments of the present disclosure shall be further described in the following text with reference to the figures and the embodiments. The following embodiments are only used for explaining more clearly the technical solution of the present disclosure rather than limiting the protection scope of the present disclosure.

Reference numerals: 100 detection module; 110 signal output unit; 120 detection unit; 130 control unit; 200 data processing unit.

FIG. 1 is a flow chart illustrating a method for detecting a display screen in an embodiment of the present disclosure. The method for detecting a display screen comprises steps of:

S1: detecting a component of a primary color in the light at a display side of the display screen when a first display signal is input to the display screen, wherein the first display signal is used for displaying a monochromatic image in black;

S2: detecting the component of the primary color in the light at the display side of the display screen when a second display signal is input to the display screen, wherein the second display signal is used for displaying a monochromatic image in a color other than black; and S3: calculating a difference between the component of the primary color which is detected when the second display signal is input and the component of the primary color which is detected when the first display signal is input, and determining whether there is a fault in the display screen according to the difference.

According to a method for detecting a screen in an embodiment of the present disclosure, an intensity of ambient light of the environment where the display screen is located is obtained by detecting an intensity of light at a display side of the display screen when a first display signal is input to the display screen, and the intensity of ambient light is subtracted from the intensity of light which is measured during displaying to reduce the effect of the ambient light of the detection results, so that the final detection results are more close to the actual case of the display screen.

In the above method, there is not limitation to the sequence in which step S1 and step S2 are performed. For example, during detecting, step S1 can be performed prior to step S2. Alternatively, step S2 can be performed prior to step S1. Alternatively, step S1 and step S2 can be performed at the same time.

As an example, since the ambient light may have different intensities at position of the display side of the display screen, for purpose of making the detection results more close to the actual case, the component of primary color detected in step S2 and the component of primary color detected in step S1 can be detected at a same position.

In the present disclosure, a color sensor can be applied to detect the component of primary color of the light at the display side of the display screen. Since color sensors are potentially subject to different measurement errors, as an example, the component of primary color detected in the above mentioned step S2 and the component of primary color detected in step S1 can be detected by a same color sensor.

In the above method, it is possible to only detect the component of one primary color in the light (e.g. red primary color, green primary color, or a blue primary color). For example, the component of red primary color in the light at the display side of the display screen when the first display signal is input is detected in step S1, the component of red primary color in the light at the display side is detected again in step S2, and the component of red primary color obtained in step S2 is subtracted from the component of red primary color obtained in step S1 to provide a difference therebetween. The difference is compared with a preset value to determine whether there is a fault in the display screen.

As an example, in the above method, it is possible to detect components of three primary colors in the light, so that the difference in step S3 comprises a value of red primary color obtained by subtracting a component of red primary color which is detected when the first display signal is input from a component of red primary color which is detected when the second display signal is input, a value of green primary color obtained by subtracting a component of green primary color which is detected when the first display signal is input from a component of green primary color which is detected when the second display signal is input, and a value of blue primary color obtained by subtracting a component of blue primary color which is detected when the first display signal is input from a component of blue primary color which is detected when the second display signal is input. During determining the condition of the display screen on basis of this difference, components of three primary colors can be provided with a preset value in advance, and the difference for each primary color as obtained above is compared with the respective preset value. If the measurement results of these three primary colors are accepted, it is determined that there is no fault in the display screen, otherwise it is determined that there is a fault in the display screen.

For example, a color sensor comprising three color filters for red, green, blue can be adopted, and each color filter corresponds to a register. Different filters can be selected by reading the respective register. When a color filter is selected, the color filter only allows the light of the relevant primary color to pass through, and blocks light of other primary colors, so that the component of the relevant primary color can be measured. For instance, if a blue filter is selected, only the blue component in the light to be collected can pass through the blue filter, while the red and green components cannot pass through. In this way, the intensity of blue light can be obtained. Similarly, by selecting other filters, intensities of red primary color and green primary color in the light can be obtained.

Figure 2:
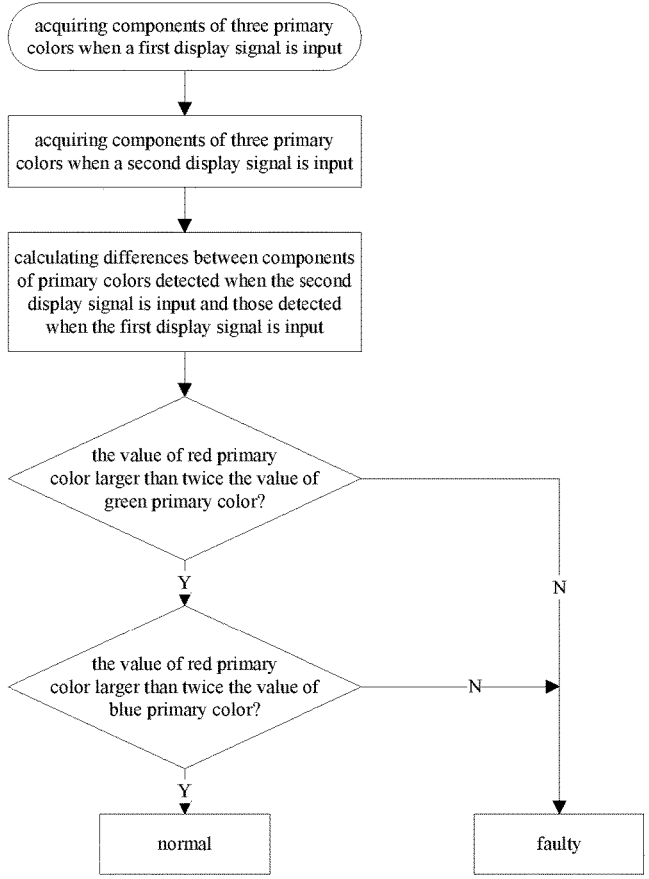
FIG. 2 is a flow chart illustrating another method for detecting a display screen in an embodiment of the present disclosure.

The detecting method in the present disclosure is not only applicable to a liquid crystal display screen, but also to an OLED display screen. During detecting, the monochromatic image displayed by the second display signal can be a monochromatic image in any color apart from a black image, e.g. a yellow image, a purple image. As an example, the above mentioned monochromatic image can be an image in a primary color like a red primary color, a green primary color, or a blue primary color. When the second display signal corresponding to the image in the relevant primary color is input to the display screen, the component of red primary color, the component of green primary color, and the component of blue primary color are acquired by the color sensor, and the acquired components of primary colors when the first display signal is input are subtracted from these components of primary colors, so as to provide three values for each primary color. The value of the primary color to which the monochromatic image corresponds to is compared with the values of other primary colors multiplied by N, to determine whether there is a fault in the display screen, wherein N is a natural number larger than zero (e.g., N can be 1 or 2). In case the component of a primary color is larger than N times the value for any of the remaining primary colors, it is determined the display screen operates normally, otherwise it is determined that there is a fault in the display screen. For example, reference is made to an example in which an image in red primary color is detected. As shown in FIG. 2, a first display signal is firstly input to the display screen, and components of three primary colors (RGB) are acquired by a color sensor. Then, a second display signal for displaying an image in red primary color is input, and components of three primary colors (RGB) are acquired again by the color sensor. The components of three primary colors (RGB) acquired in the first time are subtracted from the components of three primary colors (RGB) acquired in the second time, to obtain three values. Finally, among the obtained three values, it is judged whether the value of red primary color is larger than two times the values of the other colors. If so, it is determined that there is no fault in the liquid crystal display screen; otherwise it is determined that there is a fault in the liquid crystal display screen, and an alert is issued.

Figure 3:
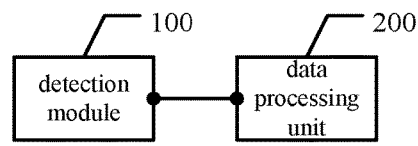
FIG. 3 is a schematic view illustrating an apparatus for detecting a display screen in an embodiment of the present disclosure.

FIG. 3 is a schematic view illustrating an apparatus for detecting a display screen in an embodiment of the present disclosure. The apparatus for detecting a display screen comprises:

a detection module 100, operable to detect a component of a primary color in the light at a display side of the display screen when a first display signal is input to the display screen, wherein the first display signal is used for displaying a first monochromatic image in e.g., black, and detect the component of the primary color in the light at the display side of the display screen when a second display signal is input to the display screen, wherein the second display signal is used for displaying a second monochromatic image, e.g., in a color apart from black; and a data processing unit 200, operable to calculate a difference between the component of the primary color which is detected when the second display signal is input and the component of the primary color which is detected when the first display signal is input, and determine whether there is a fault in the display screen according to the difference.

In an embodiment of the present disclosure screen detection apparatus, an intensity of ambient light of the environment where the display screen is located is obtained by detecting an intensity of light at a display side of the display screen when a first display signal is input to the display screen, and the intensity of ambient light is subtracted from the intensity of light which is measured during displaying to reduce the effect of the ambient light of the detection results, so that the final detection results are more close to the actual case of the display screen.

The detection module 100 can comprise:

a signal output unit 110, operable to input the first display signal and the second display signal to the display screen;

a detection unit 120, operable to detect the component of the primary color in the light at the display side of the display screen, wherein, for example, the detection unit 120 can be a color sensor; and a control unit 130, operable to control the detection unit to detect the component of the primary color in the light at the display side of the display screen, when the signal output unit inputs the first display signal to the display screen, and control the detection unit to detect the component of the primary color in the light at the display side of the display screen when the signal output unit inputs the second display signal to the display screen.

Figure 4:
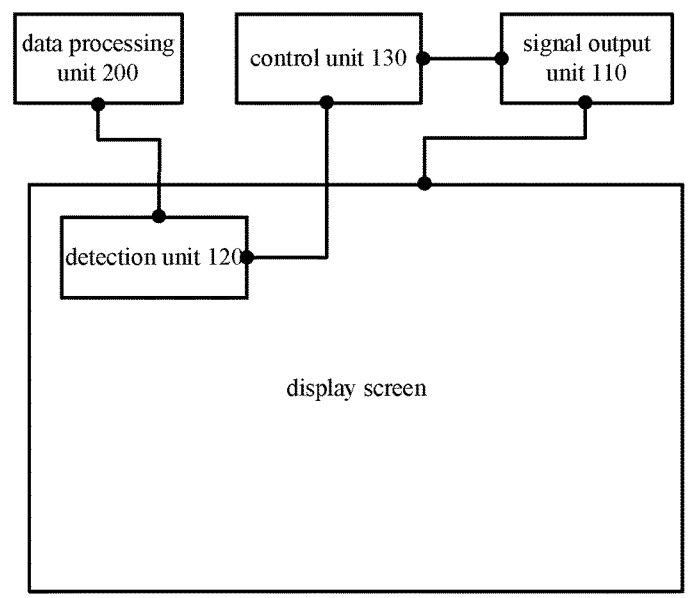
FIG. 4 is a schematic view illustrating an apparatus for detecting a display screen in an embodiment of the present disclosure.

As shown in FIG. 4, during detecting, firstly the detection unit 120 is disposed at the display side of the display screen. Then, under control of the control unit 130, when the first display signal is input to the display screen by the signal output unit 110, the detection unit 120 acquires a component of a primary color in the light at the display side of the display screen, and transmits it to the data processing unit 200. When the second display signal is input to the display screen by the signal output unit 110, the detection unit 120 again acquires the component of the primary color in the light at the display side of the display screen, and transmits it to the data processing unit 200. Upon receipt of the data obtained from the above detections, the data processing unit 200 subtracts the components of three primary colors (RGB) acquired in the first time from the components of three primary colors (RGB) acquired in the second time, respectively, to obtain differences therebetween, and it is determined whether there is a fault in the display screen according to the obtained differences.

As an example, the primary colors which are acquired as above comprise a red primary color, a green primary color, and a blue primary color. The differences comprise the value of red primary color obtained by subtracting a component of red primary color which is detected when the first display signal is input from a component of red primary color which is detected when the second display signal is input, a value of green primary color obtained by subtracting a component of green primary color which is detected when the first display signal is input from a component of green primary color which is detected when the second display signal is input, and a value of blue primary color obtained by subtracting a component of blue primary color which is detected when the first display signal is input from a component of blue primary color which is detected when the second display signal is input.

As an example, the monochromatic image is an image in a primary color selected from a group consisting of a red primary color, a green primary color, and a blue primary color. The data processing unit compares a value of a primary color in the difference with a value of another primary color multiplied with N, to determine whether there is a fault in the display screen, wherein N is a natural number larger than zero.

As an example, the above mentioned apparatus for detecting a display screen further comprises an alert module (not shown), operable to issue an alert after it is determined that there is a fault in the display screen.

Apparently, the person with ordinary skill in the art can make various modifications and variations to the present disclosure without departing from the spirit and the scope of the present disclosure. In this way, provided that these modifications and variations of the present disclosure belong to the scopes of the claims of the present disclosure and the equivalent technologies thereof, the present disclosure also intends to encompass these modifications and variations.

What is claimed is:

1. An apparatus for detecting a display screen, comprising:
   a detection module, operable to detect a component of a primary color in the light at a display side of the display screen when a first display signal is input to the display screen, wherein the first display signal is used for displaying a monochromatic image in black, and detect the component of the primary color in the light at the display side of the display screen when a second display signal is input to the display screen, wherein the second display signal is used for displaying a monochromatic image in a color other than black; and
   a data processing unit, operable to calculate a difference between the component of the primary color which is detected when the second display signal is input and the component of the primary color which is detected when the first display signal is input, and compare a value of a primary color in the difference with a value of another primary color multiplied with N, to determine whether there is a fault in the display screen, wherein N is a natural number and N≥1.

2. The apparatus of claim 1, wherein the detection module comprises:
   a signal output unit, operable to input the first display signal and the second display signal to the display screen;
   a detection unit, operable to detect the component of the primary color in the light at the display side of the display screen;
   a control unit, operable to control the detection unit to detect the component of the primary color in the light at the display side of the display screen, when the signal output unit inputs the first display signal to the display screen, and control the detection unit to detect the component of the primary color in the light at the display side of the display screen when the signal output unit inputs the second display signal to the display screen.

3. The apparatus of claim 1, wherein the primary color comprises a red primary color, a green primary color, and a blue primary color.

4. The apparatus of claim 1, wherein the difference comprises a value of red primary color obtained by subtracting a component of red primary color which is detected when the first display signal is input from a component of red primary color which is detected when the second display signal is input, a value of green primary color obtained by subtracting a component of green primary color which is detected when the first display signal is input from a component of green primary color which is detected when the second display signal is input, and a value of blue primary color obtained by subtracting a component of blue primary color which is detected when the first display signal is input from a component of blue primary color which is detected when the second display signal is input.

5. The apparatus of claim 4, wherein the monochromatic image is an image in a primary color selected from a group consisting of a red primary color, a green primary color, and a blue primary color.

6. The apparatus of claim 1, wherein further comprising an alert module operable to issue an alert after it is determined that there is a fault in the display screen.

7. The apparatus of claim 2, wherein the detection unit is disposed at a same position to detect the component of the primary color which is detected when the second display signal is input and the component of the primary color which is detected when the first display signal is input.

8. The apparatus of claim 2, wherein a same detection unit is arranged to detect the component of the primary color which is detected when the second display signal is input and the component of the primary color which is detected when the first display signal is input.

9. A method for detecting a display screen, comprising:
   detecting a component of a primary color in the light at a display side of the display screen when a first display signal is input to the display screen, wherein the first display signal is used for displaying a monochromatic image in black;
   detecting the component of the primary color in the light at the display side of the display screen when a second display signal is input to the display screen, wherein the second display signal is used for displaying a monochromatic image in a color other than black; and
   calculating a difference between the component of the primary color which is detected when the second display signal is input and the component of the primary color which is detected when the first display signal is input, and comparing a value of a primary color in the difference with a value of another primary color multiplied with N, to determine whether there is a fault in the display screen, wherein N is a natural number and N≥1.

10. The method of claim 9, wherein the component of the primary color which is detected when the second display signal is input and the component of the primary color which is detected when the first display signal is input are detected at a same position.

11. The method of claim 9, wherein the component of the primary color which is detected when the second display signal is input and the component of the primary color which is detected when the first display signal is input are detected by a same color sensor.

12. The method of claim 9, wherein the primary color comprises a red primary color, a green primary color, and a blue primary color.

13. The method of claim 12, wherein the difference comprises a value of red primary color obtained by subtracting a component of red primary color which is detected when the first display signal is input from a component of red primary color which is detected when the second display signal is input, a value of green primary color obtained by subtracting a component of green primary color which is detected when the first display signal is input from a component of green primary color which is detected when the second display signal is input, and a value of blue primary color obtained by subtracting a component of blue primary color which is detected when the first display signal is input from a component of blue primary color which is detected when the second display signal is input.

14. The method of claim 13, wherein the monochromatic image is an image in a primary color selected from a group consisting of a red primary color, a green primary color, and a blue primary color.

15. The method of claim 9, wherein after it is determined that there is a fault in the display screen, the method further comprises issuing an alert.

* * * * *